United States Patent [19]

Hardy et al.

[11] Patent Number: 4,474,467
[45] Date of Patent: Oct. 2, 1984

[54] WAVEFRONT SENSOR USING A SURFACE ACOUSTIC WAVE DIFFRACTION GRATING

[75] Inventors: John W. Hardy, Lexington; Jeffrey H. Everson, Reading, both of Mass.

[73] Assignee: Itek Corporation, Lexington, Mass.

[21] Appl. No.: 335,118

[22] Filed: Dec. 28, 1981

[51] Int. Cl.³ .............................................. G01B 9/02
[52] U.S. Cl. .................................. 356/353; 350/358; 356/354
[58] Field of Search ............... 356/353, 354, 355, 356, 356/363; 350/162.23, 358

[56] References Cited

U.S. PATENT DOCUMENTS

| | | | |
|---|---|---|---|
| 3,633,996 | 1/1972 | Lean et al. | 350/358 |
| 3,666,349 | 5/1972 | Hubby, Jr. | |
| 3,714,607 | 1/1973 | Culter | |
| 3,829,219 | 8/1974 | Wyant | |
| 3,935,566 | 1/1976 | Shopko | 350/358 X |
| 4,019,818 | 4/1977 | Vilkomerson | |
| 4,046,477 | 9/1977 | Kaule | |
| 4,121,470 | 10/1978 | Kaule | |
| 4,157,863 | 6/1979 | Clark | 350/359 X |

OTHER PUBLICATIONS

Ebersole et al., "Collimatel Light Acoustooptic Lateral Shearing Interferometer", *Applied Optics*, vol. 13, No. 5, pp. 1004–1005, 5/1974.

*Primary Examiner*—Davis L. Willis
*Assistant Examiner*—Matthew W. Koren
*Attorney, Agent, or Firm*—Homer O. Blair; Robert L. Nathans; Gerald H. Glanzman

[57] ABSTRACT

A wavefront sensor for detecting the slope of an input wavefront. A surface acoustic wave reflective diffraction grating is positioned at a focal point of the wavefront, and generates surface acoustic waves at two primary frequencies $f_1$ and $f_2$. The reflective diffraction grating produces a first AC shearing interferogram between two like diffraction orders generated by the $f_1$ and $f_2$ surface acoustic waves. A photodetector array is positioned to detect the shearing interferogram at a two dimensional array of zones, and the phase of the output signal for each zone is representative of the local slope of the wavefront in the direction of shearing, thus producing the slope in one direction. Complete two dimensional wavefront slope information is obtained by shearing the wavefront in a second orthogonal direction in substantially the same manner utilizing a second surface acoustic wave diffraction grating and a second photodetector array.

8 Claims, 4 Drawing Figures

WAVEFRONT SENSOR USING A SURFACE ACOUSTIC WAVE DIFFRACTION GRATING

BACKGROUND OF THE INVENTION

1. Field of the Invention

The present invention relates generally to a wavefront sensor for detecting wavefront tilts, and more particularly pertains to a wavefront sensor of the aforementioned type utilizing a surface acoustic wave generator which produces a reflecting diffraction grating by surface deformations induced by acoustic waves in a solid medium.

Wavefront sensors have particular utility in the field of active optics for sensing the distortion of an optical wavefront from a desired wavefront shape such as a plane or spherical wavefront. The field of active optics technology can be applied to high performance optical systems which encounter or are subject to random disturbances such as vibration, thermal transients or atmospheric turbulence, such as laser beam control systems and compensated imaging systems. In greater detail, the wavefront sensor of the present invention was designed as a diagnostic tool for a laser beam which can be considered to be essentially a point source of monochromatic radiation.

2. Discussion of the Prior Art

Wyant U.S. Pat. No. 3,829,219 is considered to be somewhat pertinent to the present invention as this patent is also concerned with a wavefront sensor for detecting the shape of a wavefront surface by the utilization of an AC shearing interferometer. In a greater detail, this patent discloses a shearing interferometer for producing a shearing interferogram of a wavefront being converged to a focal point in which two diffraction gratings having slightly different frequency line spacings are placed near the focal point of the wavefront. The diffraction gratings produce two first diffraction orders at two slightly different angles, which results in a shearing interferogram being generated in the region of overlap. The resulting shearing interferogram yields wavefront information in one direction. Complete wavefront information in two directions is obtained by shearing the wavefront in two orthogonal directions by placing two additional diffraction gratings having slightly different frequency line spacings near the focal point of the wavefront in an orthogonal direction relative to the first two diffraction gratings. The interferometer may use heterodyning, real time phase detection in which the irradiance of the interferogram is modulated sinusoidally by translating sideways at least one of the diffraction gratings.

Although this patent is similar in some respects to the present invention, it is quite different in several important aspects. The patented system utilizes transmissive, as opposed to reflective, diffraction gratings, and also the transmissive diffraction gratings require a mechanical oscillating drive for the gratings, such as an electromagnetic moving coil drive.

Summary of the Invention

Accordingly, it is a primary object of the present invention to provide a highly precise incremental slope wavefront sensor having a relatively simple and rugged design.

A further object of the subject invention is the provision of an incremental slope wavefront sensor capable of operation in the megahertz frequency range, and not requiring either a mechanically driven grating or an acoustic cell through which the radiation is transmitted.

Incremental slope wavefront sensors within the teachings of the present invention have many advantageous characteristics. They can operate in either monochromatic or white light, and with point or extended coherent or incoherent sources of radiation. Moreover, a surface acoustic wave diffraction grating is capable of operating over a wider spectral range than a transmissive diffraction cell. Finally, a local reference beam is not required as in many prior art wavefront sensors.

In accordance with the teachings herein, an arrangement is disclosed for detecting the slope of an input wavefront focused to a focal point. A surface acoustic wave reflective diffraction grating is positioned at the focal point, and generates surface acoustic waves at two primary frequencies $f_1$ and $f_2$. The reflective diffraction grating produces a first AC shearing interferogram between two like diffraction orders generated by the $f_1$ and $f_2$ surface acoustic waves. A photodetector array is positioned to detect the shearing interferogram at a two dimensional array of zones, and the phase of the output signal for each zone is representative of the local slope of the wavefront in the direction of shearing thereof.

Complete two dimensional wavefront slope information is obtained by shearing the wavefront in two orthogonal directions as follows. A beam splitter is positioned in the input wavefront and directs a first portion thereof to the aforementioned surface acoustic wave reflective diffraction grating. The beam splitter directs a second portion of the input wavefront to a second surface acoustic wave reflective diffraction grating positioned substantially at the focal point of the second wavefront portion. The second reflective diffraction grating also generates acoustic surface waves at two primary frequencies $f_1$ and $f_2$ to produce a second AC shearing interferogram which is sheared in a second direction substantially orthogonal to the first direction of shearing. A photodetector array is positioned to detect the second AC shearing interferogram at a two dimensional array of zones, and the phase of the output signal for each zone is representative of the local slope of the wavefront in the second direction, such that the complete slope of the wavefront in two orthogonal directions is obtained.

In a preferred embodiment, each detected shearing interferogram is formed between two like first diffraction orders, although higher orders can be detected in alternative embodiments. Each surface acoustic wave reflective diffraction grating is preferably formed on a piezoelectric base having an optically smooth surface positioned substantially at the focal point of the wave. A pair of interleaved finger electrodes are deposited on the surface, and electrical signals are applied across the pair of electrodes at the primary frequencies $f_1$ and $f_2$ to piezoelectrically generate surface acoustic waves on the surface at frequencies $f_1$ and $f_2$. Moreover, the smooth surface can have a reflective coating deposited thereon to increase its reflectance of the input wavefront. Further, acoustic energy sinks can be positioned at opposite ends of each piezoelectric base to absorb acoustic energy incident thereon.

One preferred embodiment is designed to minimize noise from the zero order undiffracted beams and undetected diffraction orders. In this embodiment the piezoelectric base includes a second optically smooth surface positioned behind the first surface, and the second surface is tranversely inclined at an angle relative to the first surface to reflect undesired light away from the photodetector array. The piezoelectric base also includes a mounting base having a recess therein below the piezoelectric base, and a beam dumping aperture is formed in the recess to receive radiation which passes through both the first and second surfaces. Further, a second pair of interleaved detector finger electrodes can be deposited on the first smooth surface to receive and detect the generated surface acoustic waves, such that the power in the generated surface waves can be effectively monitored.

BRIEF DESCRIPTION OF THE DRAWINGS

The foregoing objects and advantages of the present invention for a wavefront sensor may be more readily understood by one skilled in the art with reference being had to the following detailed description of several preferred embodiments thereof, taken in conjunction with the accompanying drawings wherein.

DETAILED DESCRIPTION OF THE DRAWINGS

Figure 1:
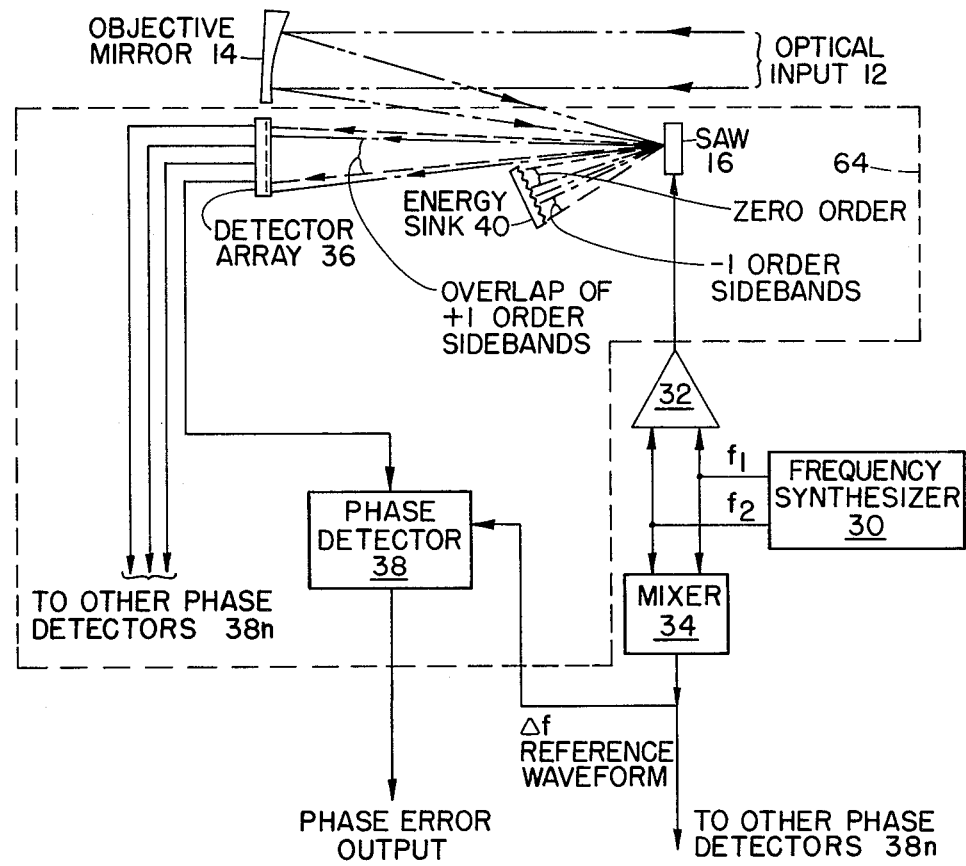
FIG. 1 is a relatively simple optical and electrical block diagram illustrating the principles of operation of the present invention.

Referring to the drawings in detail, FIG. 1 illustrates the general principles of operation of a wavefront sensor pursuant to the teachings of the present invention. A substantially collimated wavefront 12 is incident upon an objective mirror 14 which focuses the wavefront to a focal point at which a surface acoustic wave diffraction grating 16 is positioned.

Figure 2:
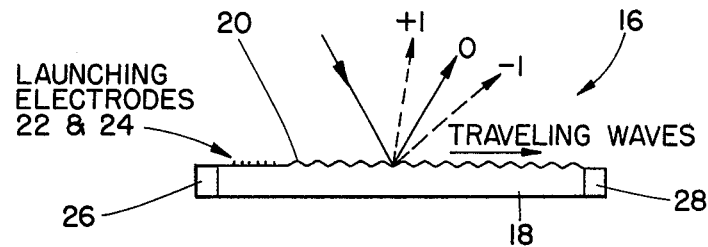
FIGS. 2 and 3 are respectively elevational and plan views of one embodiment of a surface acoustic wave diffraction grating.
Figure 3:
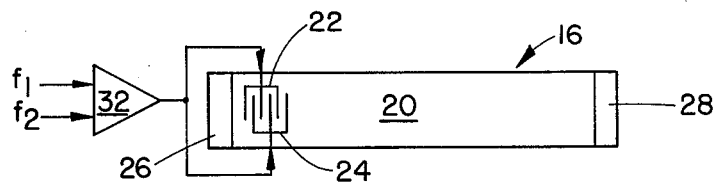

The surface acoustic wave diffraction grating 16 operates on the following general principles. Referring to FIGS. 2 and 3, the base 18 of the device is formed of a piezoelectric material such as lithium niobate having a polished, optical quality upper surface 20. An electrical potential having two primary frequencies $f_1$ and $f_2$ is applied between a pair of interleaved finger electrodes 22 and 24 at one end of the upper surface. According to known piezoelectric design criteria, the spacing between the pairs of interleaved fingers 22 and 24 should be substantially a half wave of the mean acoustic wavelength. In response thereto, the piezoelectric reaction of the base causes standing compressive waves at frequencies $f_1$ and $f_2$ to be generated between the pair of interleaved electrode fingers in the upper surface of the base. The standing compressive waves then propagate along the upper surface 20 in directions substantially perpendicular to the electrode fingers.

The compressive waves traveling to the right in FIGS. 2 and 3 are the waves utilized during operation of the surface acoustic wave grating, while those travelling to the left can be ignored, or alternatively an energy sink 26, such as a wax mass, can be applied to the left end of the device to absorb the acoustical waves. A further energy sink 28 can also be applied to the right side of the base to absorb the acoustic waves after they have traversed the area of the incident optical beam.

The surface acoustic wave device 16 is operated simultaneously at two primary frequencies $f_1$ and $f_2$ to develop an AC shearing interferogram which can be detected to develop the wavefront information required by a wavefront slope detector. The surface acoustic wave diffraction grating operates as follows. The focused wavefront incident on the surface 17 is reflected to produce zero-order (specular) reflection and also first, second and higher diffraction orders.

When the surface traveling wave contains two primary frequency components $f_1$ and $f_2$, the first frequency $f_1$ produces a first, $n^{th}$ order diffracted beam, while the second higher frequency $f_2$ produces a second, $n^{th}$ order diffracted beam which is angularly displaced (the higher diffraction frequency $f_2$ diffracts the radiation at a greater angle) relative to the first, $n^{th}$ order diffracted beam by an amount related to the difference in frequency, $\Delta f = f_2 - f_1$. In the region of overlap of the $n^{th}$ order diffracted beams a shearing interferogram is developed which is AC modulated at the frequency $\Delta f$, and this AC shearing interferogram is detected to determine the wavefront slope in the direction of the shear.

In actual practice, there are zero order undiffracted rays which are continuations of the beam from the objective mirror 14. For each frequency $f$, positive and negative first diffraction orders are produced which are angularly displaced symmetrically about the zero order undiffracted rays, and positive and negative second and higher diffraction orders are also produced which are angularly displaced symmetrically about the zero order rays. In the present invention, only one corresponding set (for instance the first, positive orders) of diffraction orders for the diffraction frequencies $f_1$ and $f_2$ is of interest and is detected.

The following mathematical treatment is instructional in designing the surface acoustic wave reflective diffraction grating. The average frequency (between $f_1$ and $f_2$) must be high enough to angularly separate the zero order, first order, and higher order sidebands, while the difference in frequency $\Delta f$ determines the AC modulation frequency of the diffraction bands.

If the input beam f/number is F, then the required diffraction angle is $\theta \geq 1/F$.

The grating equation is $$\sin\theta = \sin\theta_0 \pm (n\lambda/\Lambda)$$

where $\theta_0$ is the incident angle, n is the diffraction order interger. $\lambda$ is the optical wavelength, and $\Lambda$ is the acoustic wavelength. The quantity $\Lambda$ is given by V/f, where V is the acoustic velocity and f is the frequency. Setting $\theta_0 = 0$ and $n = +1$ yields.

$$\sin\theta = \lambda/\Lambda$$

and for small angles $$\theta \simeq \lambda/\Lambda = \lambda f/V$$

thus, $$f \geq V/F\lambda$$

The frequency difference is chosen to give the required angular shear $\theta_s$ in the first order sidebands.

$$\theta_s = \lambda \Delta f/V$$

A suitable surface acoustic wave device could operate at a 300/MHz nominal frequency wherein $f_1$ and $f_2$ are separated by approximately 50 KHz. For these frequencies, the transmitting finger electrodes 22 and 24 should be separated by approximately 5.3 um, and a suitable width for each finger electrode is approximately 1 to 2 um.

Referring back to FIG. 1, a frequency synthesizer 30, which can for instance be a voltage controlled oscillator, produces two electrical signals $f_1$ and $f_2$ which are applied to amplifier 32, and the amplified output thereof directed across the launching finger electrodes 22 and 24. The signals $f_1$ and $f_2$ are also mixed in circuit 34 to produce a reference signal $\Delta f$.

A two dimensional photodetector array 36 is positioned in the overlapping area of the +1 diffraction orders, and can for instance be a silicon detector array incorporating preamplifiers therein as are commercially available from Silicon Detector Corporation.

The two sheared beams produce an interference pattern modulated in intensity at temporal frequency $\Delta f$. The AC signal picked up by each detector in the detector array is compared in phase in a phase detector circuit 38 with the $\Delta f$ reference signal. The output of each phase detector is a voltage that is proportional to the average wavefront slope in the zone corresponding to that particular detector element.

The zero order reflected radiation, as well as other unwanted diffraction orders can be directed onto a suitable energy sink 40.

Figure 4:
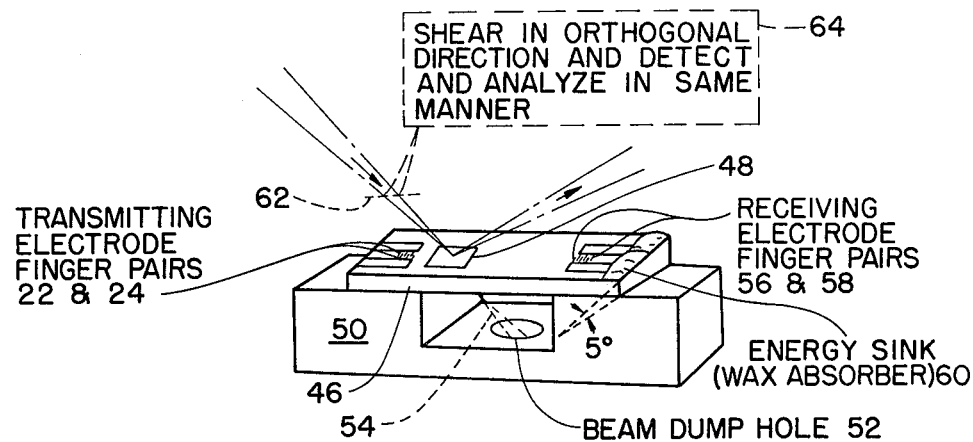
FIG. 4 illustrates an improved and more elaborate surface acoustic wave diffraction grating which may be employed in the wavefront sensor of FIG. 1.

FIG. 4 illustrates a more elaborate surface acoustic wave diffraction device 44 which is designed to substantially eliminate radiation not of interest such as unwanted reflections and scattered light. The embodiment 44 was designed on an oriented lithium niobium (LiNb O$_3$) crystal base 46 having its top and bottom surfaces polished to $\lambda$/10. A coating 48 such as aluminum can be applied to the upper surface to increase reflection therefrom, but the coating must be maintained fairly thin (<1000°A) to preserve the surface characteristics of the device. The coating reduces, but does not eliminate, noise problems caused by light scattering from the lower or rear surface of the base. To further reduce this problem, the upper or lower surfaces of the base 46 are fabricated with a transverse angle (5°) therebetween which causes the light reflected from the back surface to be reflected away from the test area occupied by the photodetector array.

A phenolic base 50 is utilized to mount the surface acoustic wave device 44, and includes a recessed central volume having a hole 52 therein which permits portions 54 of the beam passing through both the upper and lower surfaces of the base 46 to be removed therethrough away from the test area.

This embodiment also includes a second set 56 and 58 of receiving electrode finger pairs to detect the power of the acoustic wave traversing the upper surface of the device. The receiving electrode finger pairs 56 and 58 operate oppositely to the transmitting electrode pairs. A piezoelectric material, having a strain induced thereacross, produces an electric field in proportion to the strain. The receiving electrode finger pairs 56 and 58 detect the electric field induced in the piezoelectric base by the surface acoustical wave, and the resultant electrical signal across electrodes 56 and 58 could be used in a feedback control loop to sense the power through the device and control accordingly the power into the transmitting electrode pairs 22 and 24. An energy sink 60, in the form of a suitable high temperature wax, can be placed at the receiving end of the base and optionally at the transmitting end of the base also.

One suitable embodiment of the surface acoustic wave device was designed to operate at a nominal high frequency of 300 MHz and a $\Delta f$ of approximately 50 KHz. For these frequencies, an electrode finger separation of 5.3 um and an electrode finger width of 1–2 um are suitable. An embodiment of this nature should be operated near a maximum power of 1 watt to obtain a diffraction efficiency of approximately 1%.

One possible method of fabricating the electrode finger pairs of the device is to use a lift-off or reverse resist technique. In this procedure, the negative of the desired pattern is formed in photoresist, a metal coating is then applied to the entire surface, and the photoresist is later dissolved away, removing the metal layer above the photoresist and leaving the desired pattern behind. This technique places two requirements on the metal layer. It must adhere very well to the crystal, and it must be thin compared to the thickness of the photoresist. Combining these requirements with a need for high electrical conductivity in the finger pairs and high reflectivity in the reflector path indicates that aluminum would be a very suitable coating material.

Due to the extremely high resolution required, the photofabrication process is relatively sophisticated. A Shipley 1375 positive resist diluted 1:1 with AZ thinner appears suitable. This combination was spin coated at 4,000 rpm, resulting in a photoresist thickness of 0.45 um. This is considered to be a minimum safe thickness to avoid pinholes and flaking in the coating. A quartz-faced vacuum frame and ultraviolet lamp were used to make the exposure. The mask must be in intimate contact with the resist to avoid diffraction, and even in that case the exposure time is very small, since diffraction spreading of the exposing beam occurs in the thickness of the resist. This fabrication method at these high resolutions has some problems in that frequently the patterns have one or more breaks in the 1 to 2-um electrode fingers, and many attempts may be required to obtain satisfactory patterns.

Another preferred method of fabricating the electrode finger pairs of the device is to employ conventional photoresist techniques and ion milling. A chrome/gold coating appears suitable in a process in which a 50 Å layer of chromium is coated over by a 1500 Å layer of gold in deposits on a clean substrate in a dual-source vacuum deposition system. The photoresist is coated, exposed, and developed as described above, except that a positive mask is now used and the exposure intensity is reduced to compensate for the reflectivity of the metal layer. The processed device is then ion-milled to remove the metal not covered by the photoresist. In actual constructions using this process, the finger pairs were very sharply defined, but were slightly wider than desired (2.5 um). Also the DC resistance was rather low, approximately 300 ohms, but this is acceptable since the RF impedance is only 50 ohms.

The wavefront sensor described above yields shearing and wavefront slope information in one direction only. To obtain complete two dimensional wavefront slope information, it is necessary to shear the wavefront in two orthogonal directions. This could be accomplished by passing the input wave through a beam splitter 62, shown in dashed lines in FIG. 4, treating one portion thereof as taught with reference to FIGS. 1–4, and directing the second portion onto a second surface acoustic wavefront reflection grating in a manner similar to that shown in FIGS. 1-4 but wherein the direction of shear is orthogonally oriented relative to the shearing utilized on the first portion of the beam, and then detecting and analyzing the shear in the second portion in the same manner as taught above.

The components required by the second surface acoustic wave diffraction arrangement are enclosed by dashed lines 64 in FIG. 1. The circuits 30, 32 and 34 could be utilized in common with the shearing arrangement in the first direction, as $f_1$ and $f_2$ in the shearing arrangement in the second direction can be identical to $f_1$ and $f_2$ in the shearing arrangement in the first direction, or alternatively could be different frequencies. To obtain complete wavefront information in two directions the arrangement 64 must shear the incident wavefront in a direction orthogonal to the direction of shear in the first direction. Accordingly, the direction of the surface acoustic waves generated in the second reflective diffraction grating must impinge upon or shear the wavefront at an orthogonal direction relative to the direction of the surface acoustic waves generated in the first reflective diffraction grating.

The embodiment illustrated herein obtains shearing interferograms while utilizing the first diffraction orders. In some instances, it may be desirable to utilize the second or higher diffraction orders. The interferograms generated by the second diffraction orders have twice the amount of shear as the interferograms generated by the first diffraction orders. Also, the present invention is preferred for use with a wavefront being converged to a focal point wherein the surface of the device is positioned in proximity to that focal point. This results in the interferogram having a small number of fringes from which it is relatively easy to extract information. If the surface of the device is positioned away from the focal point or the focal point is not a well defined point, the resulting interferogram has more fringes and is more difficult to extract information from.

While several different embodiments and variations of the present invention for a novel wavefront sensor using a surface acoustic wave reflective diffraction grating have been described in detail, it should be apparent that the disclosure and teachings herein will suggest many other embodiments to those skilled in this art.

What is claimed is:

1. An arrangement for detecting the slope of an input wavefront, comprising:
   a. means for focusing an input wavefront to a focal point;
   b. a surface acoustic wave reflective diffraction grating positioned substantially at said focal point and generating acoustic surface waves at two primary frequencies $f_1$ and $f_2$ to produce a first AC shearing interferogram, sheared in a first direction, between two like diffraction orders generated by the $f_1$ and $f_2$ surface acoustic waves;
   c. photodetector means positioned to detect the first AC shearing interferogram at a two dimensional array of zones and for producing an output signal for each zone, such that the phase of each output signal is representative of the local slope of the wavefront in said first direction in that zone;
   d. a beam splitter means in the input wavefront for directing a first portion thereof to said surface acoustic wave reflective diffraction grating, and for directing a second portion of the input wavefront to a second surface acoustic wave reflective diffraction grating positioned substantially at the focal point of said second portion of the input wavefront, said second surface acoustic wave reflective diffraction grating generating acoustic surface waves at two primary frequencies $f_1$ and $f_2$ to produce a second AC shearing interferogram, sheared in a second direction substantially orthogonal to said first direction, between two like diffraction orders generated by the $f_1$ and $f_2$ surface acoustic waves; and
   e. a second photodetector means positioned to detect the second AC shearing interferogram at a two dimensional array of zones and for producing an output signal for each zone, such that the phase of each output signal is representative of the local slope of the wavefront in said second direction in that zone.

2. An arrangement for detecting the slope of an input wavefront as claimed in claim 1, wherein each surface acoustic wave reflective diffraction grating is formed on a piezoelectric base having a first smooth surface, positioned substantially at said focal point, on which a pair of interleaved finger electrodes are deposited, and including means for generating and applying across said pair of electrodes electrical signals at said primary frequencies $f_1$ and $f_2$ to generate surface acoustic waves at frequencies $f_1$ and $f_2$ on said smooth surface.

3. An arrangement for detecting the slope of an input wavefront as claimed in claim 2, each first smooth surface including a reflective coating thereon to increase its reflectance of the input wavefront.

4. An arrangement for detecting the slope of an input wavefront as claimed in claim 2, including at least one acoustic energy sink on each piezoelectric base for absorbing acoustic energy incident thereon.

5. An arrangement for detecting the slope of an input wavefront as claimed in claim 2, each piezoelectric base having a second smooth surface positioned optically behind the first smooth surface, each second smooth surface being transversely inclined at an angle relative to the first smooth surface to cause light to be reflected away from each two dimensional detector means.

6. An arrangement for detecting the slope of an input wavefront as claimed in claim 5, including a mounting base for each piezoelectric base, each mounting base including a recess therein below each piezoelectric base in the direction in which the input wavefront is being focused to a focal point, and a beam dumping aperture in each mounting base for radiation in the focused wavefront which passes through both the first and second smooth surfaces.

7. An arrangement for detecting the slope of an input wavefront as claimed in claim 2, including a second pair of interleaved finger electrodes deposited on each first smooth surface for receiving and detecting the generated surface acoustic waves, whereby the power in the generated surface acoustic wave can be monitored.

8. An arrangement for detecting the slope of an input wavefront as claimed in claim 1 or 2, each two dimensional photodetector means being positioned to detect a shearing interferogram formed between two first diffraction orders.

* * * * *